United States Patent Office 3,486,846
Patented Dec. 30, 1969

3,486,846
PROCESS FOR THE MANUFACTURE OF HYDROXYL-AMMONIUM-SALTS
Hans Zirngibl, Duisburg, Rudolf Gerken, Krefeld, Heinz Heine, Krefeld-Uerdingen, and Johannes Weise, Krefeld-Bockum, Germany, assignors to Farbenfabriken Bayer Aktiengesellschaft, Leverkusen, Germany, a corporation of Germany
No Drawing. Filed Dec. 7, 1966, Ser. No. 599,703
Claims priority, application Germany, Dec. 28, 1965, F 48,020
Int. Cl. C01c 1/24
U.S. Cl. 23—117       5 Claims

ABSTRACT OF THE DISCLOSURE

Process for producing hydroxyl-ammonium salts by reduction of nitric oxide with hydrogen in an aqueous mineral acid in the presence of a noble metal catalyst which has been treated with a 2–50% solution of sulfuric acid at a temperature of 20–100° C. for from 4 hours to 6 days to improve the activity and selectively of the catalyst.

FIELD OF THE INVENTION

This invention relates to a process for the production of hydroxyl-ammonium salts.

DESCRIPTION OF THE PRIOR ART

It is known that hydrogen and nitric oxides can be reacted in an acid medium in the presence of noble metal catalysts to form hydroxyl-ammonium salts (German patent specification No. 96,363 and German Auslegeschrift No. 1,177,118). The noble metals serving as catalysts can be used by themselves or on acid-resistant supports. It is also known that, during the production of the hydroxylamine, a concurrent reaction occurs which leads to the coproduction of ammonia or of ammonium salts. Many processes have been described for suppressing this concurrent reaction as far as possible without reducing the yield of hydroxylamine. According to German patent specification No. 885,396, it has been proposed partially to poison the catalysts by adding lead, mercury, arsenic, antimony, bismuth, sulphur, selenium or tellurium.

SUMMARY OF THE INVENTION

It is an object of the present invention to provide a process for the production of hydroxyl-ammonium salts in substantially pure form. It is another object of the present invention to provide a process for the production of hydroxyl-ammonium salts with high yield and selectivity.

Other objects of the present invention will become known in the following description.

The present invention provides a process for the production of hydroxyl-ammonium salts from nitric oxide and hydrogen in the presence of a noble metal catalyst and in acid solution at a temperature of from 0° C. to 80° C., in which, before use, the conventional noble metal catalyst is formed by contacting it with a sulphuric acid solution at a temperature of up to 100° C. for a period of time sufficient to increase the activity and selectivity of the catalyst.

It was surprisingly found that, in the production of hydroxyl-ammonium salts from NO and $H_2$, the activity and selectivity of the commonly employed noble metal catalysts can be improved without other additions if these catalysts are treated before they are first used by contacting them at temperatures up to 100° C. with sulfuric acid.

DESCRIPTION OF THE PREFERRED EMBODIMENTS

The forming takes place in 2% to 50% sulphuric acid, preferably 15 to 30%, and it is advantageous to work with 20% sulphuric acid. The best possible forming period depends on the temperature employed and on the special manufacturing conditions of the catalyst. Preferably the time of treatment is between 4 hrs. and 6 days. It is preferred to work at a temperature of from 60° C. to 100° C. However, lower temperatures, for example of 20° C., can also be used, but a correspondingly longer forming period then becomes necessary. It is advantageous for hydrogen to be introduced into the catalyst suspension in sulphuric acid during the forming operation.

The usual noble metals in finely divided form, such as platinum metals, advantageously platinum, are employed and are arranged on acid resistant supports consisting advantageously of a material comprising carbon, activated carbon or graphite.

The catalysts are prepared as known, per se, by precipitating the noble metals in finely divided form from their salt solutions by reducing agents. It is, for instance, possible to suspend the carrier in a solution of a Pt IV salt, e.g., water soluble hexachlorine-platinates or the corresponding acid and to reduce the platinum therefrom by reducing agents such as hydrazine, formaldehyde, formic acid or formates. Furthermore, it is possible to perform a two-step process wherein in the first step the platinum (IV) compounds are reduced in weakly acid solutions to platinum (II) compounds by selective reducing agents such as dithionates, sulfurous acid, sulfites and the like. In the second step, the so produced platinum (II) compounds are then precipitated on the carriers by stronger reducing agents such as hydrazine, formates, formic acid and the like. Normally the noble metals are present in an amount of 0.5 to 3.0%, preferably of about 1% by weight based on the total weight of the catalyst.

The production of the hydroxyl-ammonium sulfates is carried out as known per se in aqueous mineral acid solution, such as sulfuric acid, hydrochloric acid, nitric acid, phosphoric acid and the like, with a free acid concentration of from 0.01 to 5.0 N. In any event the pH of the reaction medium should not exceed a value of 2.5. Into the acid solution containing the catalyst in suspended form, nitric oxide and hydrogen is fed in, with a molar ratio of between 1:1.5 and 1:3.0, preferably of 1:1.6 and 1:2.0.

The reaction temperature may be between 0° C. and the boiling temperature of the reaction medium. Preferably the reaction is performed at temperatures of 30 to 80° C. The reaction can be performed either batchwise or continuously. The hydroxyl-ammonium sulfate after removing the catalyst can be used in solution, e.g., for the production of lactams. Otherwise, it can be precipitated by cooling.

The catalysts pre-treated according to the present invention permit the production of hydroxyl-ammonium salts with excellent yields per unit volume and per unit time, even on starting the reaction.

The expressions: "activity" and "selectivity" used in the present application are defined as follows: By activity is meant the percentage of the NO present in the form of hydroxyl-ammonium and ammonium salts produced, calculated on the total quantity of NO which is introduced; the selectivity is defined as 100 times the ratio of mols of hydroxyl-ammonium salt produced to the sum of the mals of hydroxyl-ammonium salt and of ammonium salt produced.

The hydroxyl-ammonium salts obtained by the present invention can be used in organic synthesis, such as the production of lactams, as reducing agents, as photographic developers, as stabilizers, etc.

The invention is illustrated by the following example.

Three samples (a), (b) and (c) were weighed out from a Pt/C catalyst containing 1% of Pt, each sample corresponding to 250 mg. of Pt, and, before the synthesis of the hydroxyl-ammonium salt:

Sample (a) was left in its original state;

Sample (b) was heated at 95° C. with 20% $H_2SO_4$ for 24 hours and with stirring; and Sample (c) was heated at 95° C. with 20% $H_2SO_4$ for 24 hours, while stirring and introducing about 10 litres of $H_2$ per hour.

The catalysts were each suspended in a litre of approximately 20% sulphuric acid and gasified while stirring vigorously at about 40° C., and with a constant gas charge of about 10 litres of $NO/H_2$ mixture, until 3.2 mols of NO had been introduced. The average activities and selectivities are shown in the following table:

|  | (a) | (b) | (c) |
|---|---|---|---|
| Activity (percent) | 71 | 81 | 90 |
| Selectivity | 3.5 | 62 | 89 |

This table shows that a considerable improvement, particularly as regards the selectivity, is produced by the preliminary treatment of the catalysts.

What we claim is:

1. In a process for the production of hydroxyl-ammonium sulfate by introducing gaseous nitric oxide and hydrogen in a molar ration of between about 1 to 1.5 and 1 to 3 into an aqueous sulfuric acid solution having a free acid content of between 0.01 and 5 N and containing a catalyst of the platinum group, at temperatures of between 0° C. and 80° C., the improvement which comprises contacting the catalyst prior to use at a temperature of between 20 and 100° C. for from 4 hours to 6 days with a sulfuric acid solution having a concentration of between 2 and 50% to increase the activity and selectivity of the catalyst.

2. The process according to claim 1 wherein the sulfuric acid solution has a concentration of between 15 and 30%.

3. The process according to claim 1 wherein the catalyst is contacted with the sulfuric acid solution at a temperature of between 60 to 100° C.

4. The process according to claim 1 wherein the catalyst is contacted with the sulfuric acid solution at a temperature of between 90 to 95° C.

5. The process according to claim 1 wherein the forming is carried out in the presence of hydrogen.

References Cited

UNITED STATES PATENTS

| 2,798,791 | 7/1957 | Jockers et al. | 23—117 |
| 2,823,101 | 2/1958 | Jockers et al. | 23—117 |
| 3,133,790 | 5/1964 | Jockers | 23—117 X |

OSCAR R. VERTIZ, Primary Examiner

U.S. Cl. X.R.

23—50, 190